(12) United States Patent
Andrews et al.

(10) Patent No.: US 7,620,576 B1
(45) Date of Patent: Nov. 17, 2009

(54) METHOD AND APPARATUS FOR PROVIDING ORDER QUEUE INFORMATION

(75) Inventors: Ryan N. Andrews, Evanston, IL (US); Robert A. West, Chicago, IL (US); Jens-Uwe Schluetter, Evanston, IL (US); David W. Garrison, Arlington Heights, IL (US); Michael J. Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1016 days.

(21) Appl. No.: 10/348,134

(22) Filed: Jan. 21, 2003

(51) Int. Cl.
*G06Q 40/00* (2006.01)
(52) U.S. Cl. .............. 705/35; 705/36; 705/37; 705/38; 705/39
(58) Field of Classification Search .............. 705/35–39
See application file for complete search history.

(56) References Cited

U.S. PATENT DOCUMENTS

| 5,297,032 | A | 3/1994 | Trojan |
| 2002/0073017 | A1 | 6/2002 | Robertson |
| 2003/0004853 | A1 | 1/2003 | Ram |
| 2003/0009411 | A1 | 1/2003 | Ram |
| 2007/0136182 | A1* | 6/2007 | Ketchum et al. .............. 705/37 |

FOREIGN PATENT DOCUMENTS

| WO | WO00/62187 | A2 | 10/2000 |
| WO | WO00/62187 | A3 | 10/2000 |
| WO | WO01/16852 | A2 | 3/2001 |
| WO | WO01/16852 | C1 | 3/2001 |
| WO | WO 01/22315 | * | 3/2001 |
| WO | WO01/22315 | A2 | 3/2001 |
| WO | WO02/48945 | A1 | 6/2002 |
| WO | WO02/059815 | A1 | 8/2002 |

* cited by examiner

*Primary Examiner*—Daniel S Felten
(74) *Attorney, Agent, or Firm*—McDonnell Boehnen Hulbert & Berghoff LLP

(57) ABSTRACT

A system and method for providing market information are disclosed. In this application, updates are received for a tradeable object at a price level from at least one exchange. To the extent that the updates do not include enough details to compute the number of orders resting at a particular price level in a market, estimation may be used to provide order queue information. As a result, the number of orders which are pending in the market at various price levels may be determined using the techniques described herein. The interface disclosed herein may be used to display the number and/or quantity of the orders in the order queue.

6 Claims, 6 Drawing Sheets

| E/W 602 | Orders 604 | BidQ 606 | AskQ 608 | Prc 610 |
|---|---|---|---|---|
| S 0 W 11 | 3 | | 17 | 69 |
| | | | | 68 |
| | | | | 67 |
| | | | | 66 |
| | | | | 65 |
| | 4 | | 35 | 64 |
| | 2 | 12 | | 63 |
| B 0 W 20 | 4 | 35 | | 62 |
| | | | | 61 |
| | 3 | 15 | | 60 |
| | | | | 59 |
| | | | | 58 |
| | | | | 57 |

FIG. 6

METHOD AND APPARATUS FOR PROVIDING ORDER QUEUE INFORMATION

FIELD OF THE INVENTION

The present invention relates generally to electronic trading. More specifically, it relates to a method and apparatus for providing order queue information.

BACKGROUND OF THE INVENTION

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker. Electronic trading systems are also convenient for brokers on the floor at an exchange for sending and/or receiving orders electronically.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

In general, market participants or traders link to the host exchange through one or more networks. A network is a group of two or more computers linked together. There are many types of networks such as local area networks and wide area networks. Networks can also be characterized by topology, protocol, and architecture. For example, some market participants may link to the host through a direct connection such as a T1 or ISDN. Some participants may link to the host exchange through a combination of direct connections and other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs.

If there is any measurable activity in a market, the matching of orders (similar to the example given directly above) generally occurs throughout the trading day. During which time, each host exchange provides a data feed to the client devices so that the traders can have access to the most current market information. In general, market information includes the inside market and market depth. The inside market is the lowest sell price (best offer or best ask) in the market and the highest buy price (best bid) in the market at a particular point in time. Market depth refers to quantity available at the inside market and can refer to quantity available at other prices away from the inside market. The quantity available at a given price level is usually provided in aggregate sums. In other words, a host exchange usually provides the total buy or the total sell quantity available in the market at a particular price level. Additionally, host exchanges can offer other types of market information such as the last traded price (LTP), the last traded quantity (LTQ), and/or order fill information.

To a trader, it is usually more desirable to have as much information as possible to successfully characterize a market. However, it becomes too bandwidth intensive and impractical to provide all (or most) of the market information necessary to describe a market in such great detail. Therefore, each host exchange carefully limits the amount of information they provide hoping to strike a balance between providing enough information to describe the market, but not too much to cause network downtime and/or anonymity. One way to limit the amount of information is to provide market information for price levels surrounding only the inside market. That is, a host exchange might provide market depth information for a handful of price levels around the inside market, whereas another exchange might provide market depth at only the inside market price levels. Another way to limit the amount of information is to reduce the content in the data feeds to contain only minimalist types of information such as price and quantity. As a result of limiting the amount of information, most data feeds do not provide order queue information, which as used herein is the number of orders at a host exchange waiting to be matched at a particular price level.

However, having access to order queue information can be very useful to a trader. This is especially true when the host exchange distinguishes the orders by time priority (e.g., a FIFO based system that matches orders on a first in, first out basis). To profit in electronic markets traders should have access to data, such as order queue information, which can be used to help them to make desirable trades.

BRIEF DESCRIPTION OF THE DRAWINGS

FIG. 6 shows an example way to display market information for a given tradeable object, including the order queue.

DETAILED DESCRIPTION OF THE PRESENTLY PREFERRED EMBODIMENT(S)

The present method and system can be used for estimating the number of orders at a host exchange waiting to be matched at a given price level. As expressed in the background section above, because of network bandwidth limitations many host exchanges do not provide detailed market information to subscribing client devices. According to a preferred embodiment, however, market information from host exchanges is analyzed to form an estimate of the number of orders at a host exchange waiting to be matched at a given price level. This order number estimation can be displayed numerically or graphically, or both numerically and graphically to a trader at his or her terminal.

There are many advantages for a trader to have as much information as possible to successfully characterize a market. In particular, to some traders it is advantageous to know the number of orders that are waiting to be matched in a market. For example, consider that the total quantity at a certain price level is 100, but that quantity is a single order. In a conventional system, only the quantity of 100 would be displayed so that a trader using the conventional system would not recognize that the 100-lot is only one order. Instead, the trader using the conventional system might think that the 100-lot is made up of several orders. Using the present invention however, a trader would recognize that upon entering the market, he or she would essentially be a single, 100-lot order away from being the first in line in the queue. In fact, the 100-lot order need not be filled for the newly entered order to be first in line in the queue. Instead, the trader who placed the single 100-lot order may decide to cancel the 100-lot order. Entering an order to create interest in a product at a particular price level, only to delete the order when another trader shows interest, is known as "bluffing."

The present invention now will be described more fully hereinafter with reference to the accompanying drawings, in which preferred embodiments of the invention are shown. This invention may, however, be embodied in many different forms and should not be construed as limited to the embodiments set forth herein.

I. GENERAL OVERVIEW OF A SYSTEM ARCHITECTURE

Figure 1:
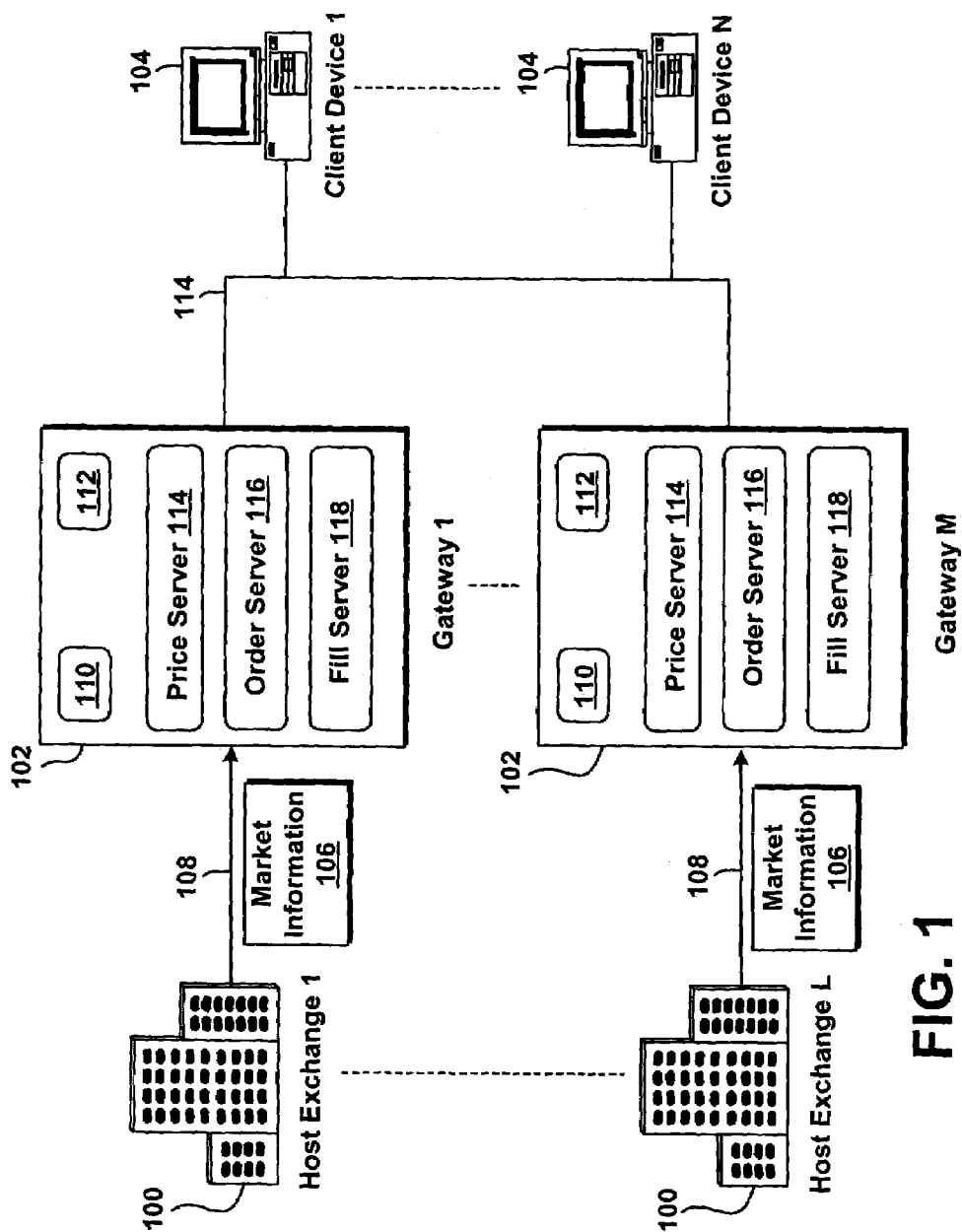
FIG. 1 shows an example system architecture for implementing electronic trading in accordance with the present invention.

FIG. 1 shows a system diagram of gateways 102 receiving market information 106 from host exchanges 100 and relaying this data to client devices 104 in accordance with the preferred embodiment. In the preferred embodiment, the system generally includes one or more host exchanges 100, one or more gateways 102, and one or more client devices 104. Preferably, the system can support up to "L" host exchanges 100 and corresponding "M" gateways 102, and can also support "N" client devices, where "L," "M," and "N" represent any number.

Although each referenced component in FIG. 1 is described directly below in their respective sections, it should be understood that the components may take the form of an entirely hardware embodiment, an entirely software embodiment, or an embodiment combining software and hardware aspects. Furthermore, some of the components of FIG. 1 may take the form of computer readable medium having computer readable program code means embodied in a storage medium. Any suitable computer readable storage medium may be utilized including hard disks, CD-ROMS, optical storage devices, or magnetic storage devices.

A. Host Exchange

Host exchanges 100 may include the International Financial Futures and Options Exchange ("LIFFE"), the Chicago Board of Trade ("CBOT"), the New York Stock Exchange ("NYSE"), the Chicago Mercantile Exchange ("CME"), the Xetra (a German stock exchange), or the European derivatives market ("Eurex"). Host exchanges 100 might also refer to other known facilities that automatically match incoming orders received from client devices 104.

Each of host exchanges 100 hosts one or more markets from which traders can trade tradeable objects. As used herein, the term "tradeable objects" refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user. A tradeable object could actually be a combination of other tradeable object, such as a class of tradeable objects.

According to the preferred embodiment, to keep participating traders informed of changes in a market, each of host exchanges 100 relays the associated market information 106 over a transmission channel 108 to the their client devices 104. Market information 108 may include data that represents just the inside market, where the inside market is the lowest sell price (best offer) in the market and the highest buy price (best bid) in the market at a particular point in time. Market information 108 may also include market depth, where market depth refers to quantity available at the inside market and can also refer to quantity available at other prices away from the inside market. Market information 108 can contain other types of market information such as the last traded price (LTP), the last traded quantity (LTQ), and/or order fill information.

Each of host exchanges 100 may send their market information 106 to at least an associated gateway 102 over a transmission channel 108. Transmission channel 108 might include any type of transmission medium known in the art. Depending on its type, transmission channel 108 can carry information in either analog or digital form. Transmission channel 108 can be a physical link, such as the cable connecting two stations in a network, or it can consist of some electromagnetic transmission, or in optical, microwave, or voice-grade communication. The foregoing examples are provided merely to illustrate the wide variety of communication mediums to which the preferred embodiments may be applied.

B. Gateway

According to the preferred embodiment, gateways 102 are computers running software that receive market information 106 from host exchanges 100. As used herein, a computer includes any device with memory 110 and a processor 112 capable of processing information to produce a desired result. Thus, a gateway 102 can be a computer of any size such as a server, workstation, personal computer, or laptop, but generally, the gateway 102 is any computer device that has the processing capability to perform the function described herein. Moreover, it should be understood that the functions of the gateway 102 could be moved to a host exchange 100 and/or the client device 104 to reduce or eliminate the need for the gateway 102.

In the preferred embodiment, a gateway 102 receives market information 106 from a host exchange 100. Preferably, gateways 102 receive market information 106 and convert it to a form compatible with the protocols used by the client device 104 using conversion techniques known in the art. Also, as known by those skilled in the art, gateway 102 may have one or more servers to support the data feeds, such as price server 114 for processing price information, order server 116 for processing order information, and fill server 118 for processing fill information. Generally, a server is software that responds to commands from a client device 104 in the form of subscriptions. That is, a trader at client device 104 can subscribe to price information, order information, and fill information for a particular market hosted at a host exchange 100. Once a client device 104 has subscribed to the information, gateway 102 preferably publishes the market information 106 at data rate compatible with the connection to the subscribing client devices 104.

According to one preferred embodiment, the present invention is implemented at a gateway 102 or some other intermediary computer device. In this embodiment, the gateway 102 receives the market information 106 from the host exchange 100 and estimates the number of orders at a host exchange 100 waiting to be matched at a given price level. The gateway 102 can publish the information with order estimation to the client devices 104 for use and/or display. The present invention may instead be implemented at the client device 104 (or implemented both at the gateway 102 and client device 104), details regarding this embodiment are described directly below with respect to the client devices 104.

Gateways 102 may send the market information 106 to the client devices 104 over one or more transmission channels 114. Transmission channels 114 might include any type of transmission medium known in the art. Depending on its type, transmission channel 114 can carry information in either analog or digital form. Transmission channel 114 can be a physical link, such as the cable connecting two stations in a network, or it can consist of some electromagnetic transmission, or in optical, microwave, or voice-grade communication. The foregoing examples are provided merely to illustrate the wide variety of communication mediums to which the preferred embodiments may be applied.

C. Client Device

Client devices 104 are computers such as a workstation, desktop, laptop, hand-held device, personal digital assistant ("PDA"), smart phone, any other wired or wireless communication device, and so forth that allows a trader to participate in one or more markets listed with a host exchange 100.

In the preferred embodiment, client devices 104 use software to create specialized interactive trading screens on terminals associated with them. Trading screens preferably enable traders to, among other things, enter and execute orders, obtain market quotes, and monitor positions. The range and quality of features available to the trader on his or her screens varies according to the specific software application being run. In addition to or in place of the interactive trading screens, a client device 104 may run automated non-interactive types of trading applications.

The preferred embodiment may be implemented on any type of trading screen, therefore details regarding the trading screen are not necessary to understand the present invention. However, for sake of illustration, a type of trading screen which can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, and U.S. patent application Ser. No. 09/971,087, entitled "Click Based Trading With Intuitive Grid Display Of Market Depth And Price Consolidation," filed on Oct. 5, 2001, the contents of both of which are incorporated by reference herein. Moreover, the trading application may implement tools for trading tradeable objects that are described in a U.S. patent application Ser. No. 10/125,894 filed on Apr. 19, 2002, entitled "Trading Tools for Electronic Trading," the contents of which are incorporated by reference.

As described above with respect to gateways 102, the present invention may be implemented at a gateway 102 or some other intermediary device. According to another preferred embodiment, however, the present invention may be implemented at a client device 104. In this alternative embodiment, a client device 104 receives the data feed from a host exchange 100 via a gateway 102 and estimates the number of orders at the host exchange 100 waiting to be matched at a given price level. The client device 104 can use and/or display the information in any fashion, however, examples are provided below.

D. Data Feed

Figure 2:
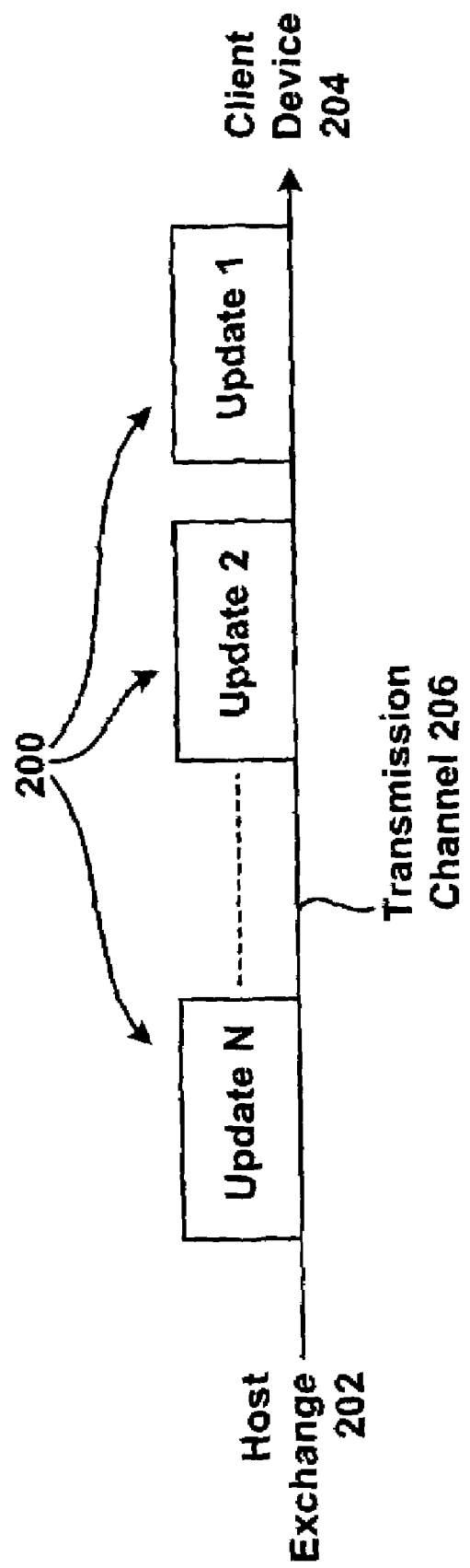
FIG. 2 shows, in a preferred way, how market updates are sent from a host exchange to a client device using a system substantially similar to the system shown in FIG. 1.

FIG. 2 illustratively shows market updates 200 being sent from a host exchange 202 to a client device 204 over a transmission channel 206. The transmission channel 206 may be similar to the transmission channels 108, 114 shown in FIG. 1, however, FIG. 2 purposely leaves out a gateway for clarity. Preferably, a portion of or all of the market information is provided to the client device 204 in the form of market updates 200. The content and type of market updates 200 most often depends on the particular host exchange 202. Two example market updates 200 include the aggregate market update and a snapshot update. It should be understood that the present invention may be adapted by one skilled in the art to work with any type of market update.

As with any market update type, quantity can be added by new orders, matches performed at the matching engine, a trader deleting his or her order, a trader changing his or her order, and so forth. An aggregate market update provides updated quantity information for price levels where the quantity level has changed. In other words, when the quantity level changes at a particular price level, the host exchange 202 broadcasts an aggregate market update which contains the new quantity level and the price to the client device 204. For example, referring to FIG. 2, preferably "update 1" is sent to the client device 204 when a change in quantity occurs at a first price level in the market. Client device 204 can process "update 1." Some time later, a second update "update 2" is sent to the client device 204 when a change in quantity occurs at the same price level or a different price level in the market. This process of sending updates can occur for "N" updates, where "N" is any number.

In the preferred embodiment, the host exchange 202 monitors all price levels (or almost all price levels) and sends out aggregate market updates accordingly. This preferred embodiment also includes the instances when the host exchange 202 monitors enough price levels around the inside market that it would be safe to assume that most, if not all, of the trading activity is accounted for. Of course, the number of price levels which would make this assumption valid would depend on the particular market and/or the tradeable objects being traded and/or the trader's strategy. For example, the LIFFE CONNECT application programming interface can provide aggregate market updates for 20 price levels above and 20 price levels below the inside market. Then, according to this example, it would be safe to assume that monitoring this many price levels would account for most of the trading activity for those markets.

There are instances when a host exchange provides aggregate market updates for only a limited number of price levels. There are several ways in which the system can be programmed to handle these particular instances. Some of the ways are described below.

A snapshot update is another example of a market update. A snapshot update is similar to an aggregate market update except that it provides updated quantity information on periodic intervals rather than when the change in quantity actually occurs. That is, at every interval (e.g., 1 second or 2 second intervals) an update is sent which provides a "snapshot" of the quantities in the market at that time. For example, the Values API used currently by Eurex can provide snapshot updates. In a slow moving market, the information provided by snapshot updates are substantially similar to the information provided by aggregate updates. In a fast moving market, however, when more than one quantity change occurs between intervals, information regarding some of those quantity changes might be lost when using snapshot updates. This lost information might result in a less precise order estimate than when using aggregate updates.

Nonetheless, snapshot updates may be analyzed similarly to aggregate market updates to provide a best guess estimate of the number of orders waiting to be matched at a given price level. Therefore, methods regarding how to analyze market updates to estimate a number of orders apply to analyzing at least aggregate and snapshot update types. Therefore, aggregate and snapshot updates, or any other similar type of market updates, may be used interchangeably herein.

II. ORDER ESTIMATOR

In the preferred embodiment, the system receives a market update and stores its contents in memory to reflect the changes in the market. An example is provided below with respect to Tables 1-3 to illustrate the concept of receiving market updates and storing their contents. The example with respect to Tables 1-3 provides only an example illustration, and it should be understood that there are other ways to receive and store market updates in accordance with this present invention. Then, this example will be used to illustrate more of the preferred embodiments. Referring first to Table 1 which shows that a market update was received and that the data has been stored. The market update was for a quantity of 20 at a price level of 74.

TABLE 1

| Price Level | Quantity |
|---|---|
| 74 | 20 |

Table 2 shows a market update was received and that the data has been stored. The update was for a quantity of 35 at a price level of 73.

TABLE 2

| Price Level | Quantity |
|---|---|
| 74 | 20 |
| 73 | 35 |

Some time later, the system received more market updates from a host exchange. These market updates are reflected in Table 3.

TABLE 3

| Price Level | Quantity |
|---|---|
| 100 | 10 |
| 75 | 35 |
| 74 | 20 |
| 73 | 35 |
| 72 | 22 |
| 69 | 25 |

In the preferred embodiment, the market updates are continuously received and stored in memory. The system can use this information to generate an order queue. As described above, the order queue provides an estimate of the number of orders at a host exchange waiting to be matched at a given price level.

Figure 3:
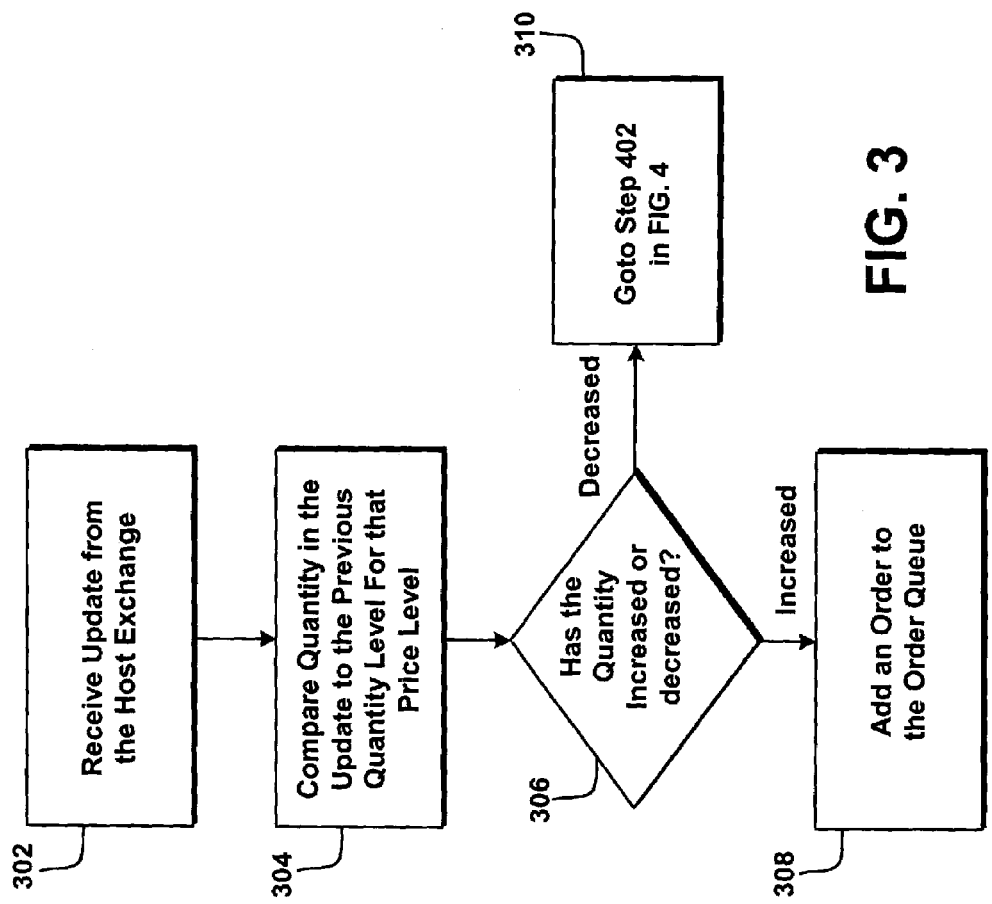
FIGS. 3-5 show a preferred method for receiving market updates of those type described with respect to FIG. 2 and generating an order queue.
Figure 4:
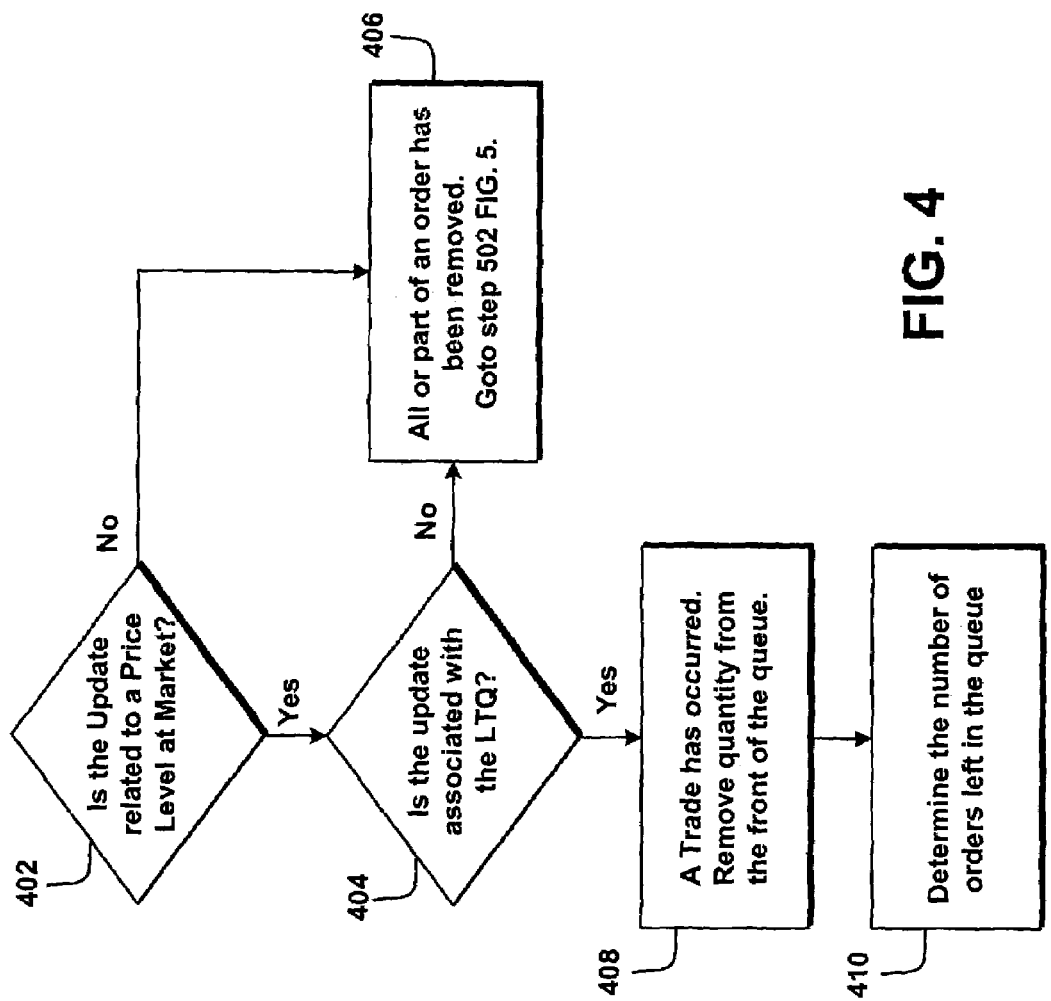
Figure 5:
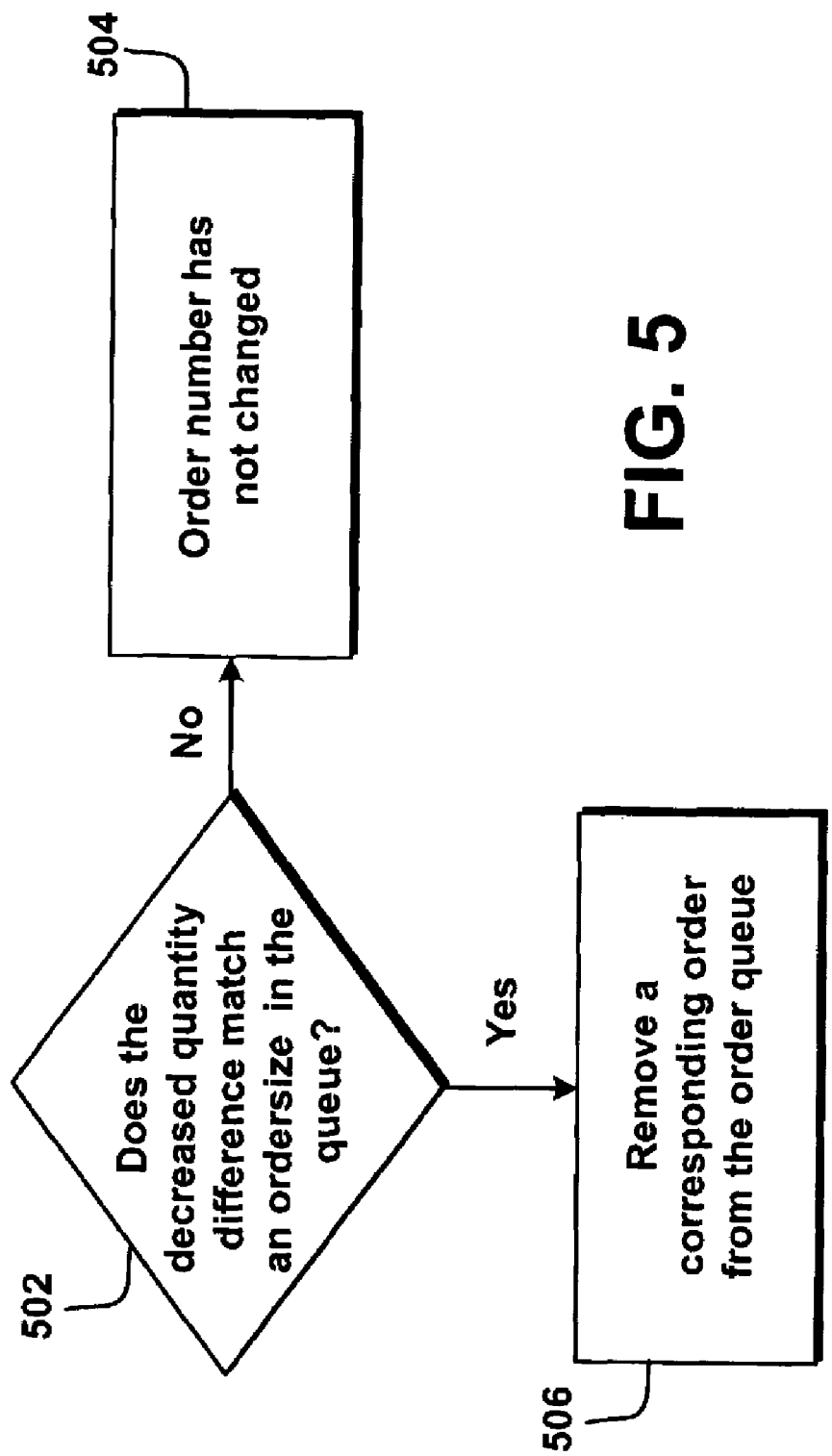

FIGS. 3-5 show a preferred method for generating an order queue. It should be understood that the method provides only an illustrative description of how to generate an order queue, and that more or fewer steps may be included in the flowchart, and/or steps may occur in one or more orders which are different from the order of steps shown in the Figures. The preferred method is illustrated together with an example shown in Tables 4-6.

Referring first to FIG. 3, at step 302, an update is received from a host exchange. Preferably, the update has at least a new quantity level associated with a particular price level. To illustrate step 302, assume that the system's memory contains the information shown in Table 3 above and that a new market update has just been received. The new update was for a quantity of 45 at the price level of 73, which was stored in memory. Table 4 reflects this new market update.

TABLE 4

| Price Level | Quantity | Number of Orders |
|---|---|---|
| 100 | 10 | 1 (10) |
| 35 | 35 | 1 (35) |
| 74 | 20 | 1 (20) |
| 73 | Old 35; New 45 | 2 (35, 10) |
| 72 | 22 | 1 (22) |
| 69 | 25 | 1 (25) |

At step 304, the system preferably compares the new quantity level to the old or previous quantity level (or 0 if there is not an old quantity) for the same price level. According to the ongoing example, the old quantity level was 35 and the new quantity level is 45.

At step 306, the system preferably determines if the quantity level has increased or decreased. If there was no quantity at the price level, then the quantity has increased by the amount in the new update and the process continues at step 308. Additionally, if the quantity is greater than the stored quantity, then the process continues at step 308. However, if the quantity is less than the stored quantity, then according to step 310, the process continues at step 402 in FIG. 4. According to the ongoing example, the quantity level has increased by 10 for the price level of 73.

At step 308, an order is added to the order queue. According to the ongoing example, two orders are now in the order queue. There was one order for a quantity of 35 in the order queue at price level 73. However, the new market update changed the quantity level to 45. Thus, an order was added having a quantity equal to the difference between the new quantity level and the old quantity level, which in this example was 10. Table 4 reflects two orders for the price level of 73 in the "Number of Orders" column. That is, the order with a quantity of 35 is first in the queue (e.g., next to be matched in a FIFO system) and the order with a quantity of 10 is second in the order queue (also last in the queue in a FIFO system because there are only two orders currently in the order queue). Note that the other prices levels have only one order each.

Now, let's assume that another market update was just received. This market update was for a quantity of 30 at the price level of 73. Table 5 reflects this new market update.

TABLE 5

| Price Level | Quantity | Number of Orders |
| --- | --- | --- |
| 100 | 10 | 1 (10) |
| 35 | 35 | 1 (35) |
| 74 | 20 | 1 (20) |
| 73 | Old 45; New 30 | 2 (20, 10) |
| 72 | 22 | 1 (22) |
| 69 | 25 | 1 (25) |

At step 306 in FIG. 3, it would be determined that the quantity has decreased from 45 to 30 at the price level of 73. Then, according to step 310, because the quantity has decreased, step 402 in FIG. 4 is analyzed.

Referring to FIG. 4, if the quantity is less than the stored quantity determined from step 310 in FIG. 3, then at step 402 the system determines if the market update is associated with a price at the inside market (e.g., lowest sell price/highest buy price). If the market update is not associated with a price at the inside market price, it is likely that the decreased quantity was a result of all or part of an order being removed at step 406. If the market update is associated with a price at the inside market price, it is likely that the decreased quantity was a result of a trade, so the process continues at step 404.

At step 404, the system preferably determines if the market update is associated with the last traded quantity (LTQ). The LTQ is preferably provided in an LTQ update to client devices. If the market update is associated with the LTQ, then a trade has occurred at step 408.

The LTQ update, however, may arrive shortly before or shortly after the market update arrives. Here are two example ways to process the market updates according to these scenarios:

If a market update (related to a price level at market) has arrived before an LTQ update, then the system could assume a trade has occurred at step 408. Then, when the LTQ update arrives, the system could determine if the market update was associated with the LTQ update. If the market update and the LTQ update are associated, then the assumption that it was a trade was correct. If the market update and the LTQ update are not associated, then the assumption was wrong, in which, the system can reanalyze the market update at step 406. This might involve changing the order queue.

If a market update has arrived after an LTQ update, then the system could assume a trade has occurred at step 408 for the quantity and price given in the LTQ update. Then, when the market update arrives that matches the LTQ, it can be simply discarded and no additional changes need to be made to the order queue.

According to the ongoing example, let's assume that an LTQ update has been received, which says the last traded quantity was 15 at a price level of 73. So, in this instance, the decreased quantity of 15 resulted in a trade or match.

At step 408, it is assumed that a trade has occurred, and therefore, quantity is removed from the one or more orders in the order queue. According to the ongoing example, a quantity of 15 is removed from the order standing first in the queue. As a result, according to the ongoing example, the order queue might look something like that shown in the "Number of Orders" column in Table 5 above.

At step 410, the number of orders left in the queue are determined. That is, if the traded quantity was less than the first order quantity, then the number of orders remains the same as before. If the traded quantity was greater than the first order quantity, then the system determines how many orders are now in the order queue. According to the ongoing example, there still remains two orders in the order queue (e.g., see price level 73 in Table 5).

Now, assume that another market update was just received. This market update was for a quantity of 20 at the price level of 73. Table 6 reflects this new market update.

TABLE 6

| Price Level | Quantity | Number of Orders |
| --- | --- | --- |
| 100 | 10 | 1 (10) |
| 35 | 35 | 1 (35) |
| 74 | 20 | 1 (20) |
| 73 | Old 30; New 20 | 1 (20) |
| 72 | 22 | 1 (22) |
| 69 | 25 | 1 (25) |

Now, analyze Table 6 according to the preferred method set forth in FIGS. 3-5. Referring first to FIG. 3, the quantity has decreased by 10 and according to step 310, the next step to analyze is step 402. Assume also that the inside market has not moved and that the lowest offer remains at 73. Then, at step 404, assume that an LTQ update for 5 was received. However, this new market update is not related to the LTQ update because the market update involves a quantity change of 10 whereas the LTQ update involves a quantity change of 5. Thus, according to step 404, the next step to analyze the market update according to step 502. Note that this LTQ update would be processed separately using one of the techniques set forth above.

At step 502, the system determines if the quantity difference matches with an order in the order queue. If the quantity difference does not match, then according to step 504, the order number has not changed because it is assumed an order has gotten smaller in size but not eliminated (see more description regarding step 504 below). If the quantity difference does match, then according to step 506, the corresponding order is removed from the order queue.

According to the ongoing example, at step 502, it would be determined that the decreased quantity of 10 does match an order size in the order queue. Thus, per step 506, the last order for 10 would be removed from the order queue. The order queue might now look something like that shown in the "Number of Orders" column in Table 6 above.

There are different ways to handle the situation when the decreased quantity matched more than one order in the order queue. According to one approach, the system would preferably look to the last of the order queue and remove the first of the matching orders. According to another approach, the system could look from the front of order queue and remove the first of the matching orders. Preferably, the system would allow a trader to select which approach they would prefer to use.

For purposes of counting order numbers, step 504 does not necessarily need to determine which order in the order queue was reduced. However, if so desired, the system could start at the back of the order queue and look to an order big enough from which this quantity could be deleted and delete the quantity. Alternatively, the system could start at the from at the front of the order queue and look to an order big enough from which this quantity could be deleted and delete the quantity.

As described above, the preferred method can be implemented at a client device or at a gateway (or some other intermediary device). If the method is implemented at the client device, the process of estimating an order number preferably occurs when a new market update and/or when a last traded quantity update are received. Although the following are described more below, the process of estimating an order number might also occur when an order entry is made or when an order confirmation is received. Once the order number is estimated, the number can be used to update the previous order number in the order queue. Then, it can be displayed. If the method is implemented at the gateway, once the order number is estimated (e.g., the order number could be estimated after a market update and/or an LTQ update) the gateway preferably broadcasts the order number in a data feed to subscribing client devices. For instance, the order number could be added to an already existing data feed, or alternatively, the order number could be put into a separate message to the client devices.

III. EXAMPLE FOR COMPUTING THE NUMBER OF ORDERS

As described above, FIGS. 3-5 show a preferred method for generating an order queue. Yet another example is provided below to illustrate this preferred method. More specifically, Table 7 below provides an example for computing the number of orders in a queue. Again, this particular example assumes that the exchange provides at least aggregate market updates consisting of price/quantity updates. That is, when the quantity at a particular price level changes, an update is sent to the gateway 102 which is then published to the client devices 104.

Note that it is preferable to start this process on price levels with "0" quantity (or starting at a point in time with an already known number of orders), because this particular method estimates the number of orders using information from the first update and updates thereafter. For example, a price level with "0" quantity might exist at the beginning of the trading day, or it might exist at any time throughout the trading day when the quantity at that price level falls to "0." If the gateway computes the order estimation, it can begin doing so at the beginning of the trading day, and keep a running count of orders for each price level. Then, when a client device logs onto a host exchange through the gateway later in the day, it can receive an accurate estimation of orders at price levels which currently have quantity. However, it is not necessary to compute the order estimation at the gateway or some other intermediary device, but instead could be computed at the client device. If it is computed at the client device, it might be preferable to start at price levels with "0" quantity and then keep track of the quantity levels at those price levels as they increase/decrease throughout the day.

Turning now to Table 7 which illustrates 7 consecutive market updates each for the price level of 100. These market updates contain the current bid/ask quantity available at the price level of 100.

TABLE 7

| Update No. | Update Qty | Price Level | Number of Orders |
|---|---|---|---|
| 1 | 1 | 100 | 1 (1) |
| 2 | 12 | 100 | 2 (1,11) |
| 3 | 17 | 100 | 3 (1,11,5) |
| 4 | 16 | 100 | 2 (11,5) |
| 5 | 10 | 100 | 2 (5,5) |
| 6 | 15 | 100 | 3 (5,5,5) |
| 7 | 35 | 100 | 4 (5,5,5,20) |

Referring to Table 7, the first update shows that a quantity of 1 exists at a price of 100. This update results from the exchange receiving an order (e.g., buy or sell order) at a price of 100. Notice that it does not necessarily matter whether the quantity is a bid or offer, because the same method applies to both. The total quantity is 1.

The second update has an order quantity of 12 at a price of 100. The second update results from the exchange receiving another order at a price of 100. So, the total number of orders is 2. The first order of 1 from the first update plus the additional order of 11 from the second update. The total quantity is 12.

The third update has an order quantity of 17 at 100. The third update results from yet another order. So, the total number of orders is 3. The first order of 1 from the first update plus the second order of 11 from the second update plus the third order of 5 from the third update. The total quantity is 17.

The fourth update, however, indicates that an order or order portion has been removed, since the quantity is now 16. Let us assume that the market update is associated with the LTQ (that the last traded quantity was 1 at a price of 100). In a FIFO matching system, the first to get matched are the first in the queue. In this example, the first order of 1 would have been matched.

The fifth update indicates that an order or order portion has been removed, because the quantity is now 10. Let us again assume that the market update is associated with the LTQ (that the last traded quantity was 6 at a price of 100). In this example, 6 of the first order has been matched.

Next, the sixth update has an order quantity of 15 at the price level 100. The sixth update results from yet another order. So, the total number of orders is 3 (recall that the first order of 1 has been filled). The second order of 5 plus the third order of 5 from the second update plus the fourth order of 5 from the sixth update. The total quantity is 15.

Finally, the seventh update has an order quantity of 35 at the price level 100. Thus, the estimated number of orders is 4. The second order of 5 plus the third order of 5 from the second update plus the fourth order of 5 from the sixth update plus the fifth order of 20 from the seventh update (e.g., Update quantity−past quantity=quantity of new order, or 35−15=20). The total quantity is 35.

The process of estimating the number of orders (and their size, for that matter) can be repeated for each update that is received. Once this type of order queue information is estimated, it can be displayed to the trader.

IV. ALTERNATIVE EMBODIMENTS FOR ORDER ESTIMATING

Steps 402 and 404 are implemented, in general, to determine if a market update is related to a trade at the host exchange. However, alternative types of available information may be used instead and therefore steps 402 and 404 could be eliminated. For instance, assume that a trader received an order fill message from a host exchange. An order fill message tells the trader that his or her order (or a portion thereof) has been filled and the message contents would include the quantity filled and the price. The system can safely assume that a trade has occurred and the system can jump from step 310 in FIG. 3 to step 408 in FIG. 4. Using order fill information in a manner such as this can work well for a trading house that has many traders which make up a large portion of a particular market's activity. For instance, the traders would link to the host exchange through a gateway, such as described with respect to FIG. 1. Then, when anyone of the traders submits an order to the host exchange, it would pass through the gateway. The gateway could track the orders sent to the host exchange and any order fill messages sent from the host exchange. As described above, the order fill information can be used to assume a trade has occurred. The more order fill information, the more accurate the order queue can become.

Another alternative type of available information that might be useful in assisting in the estimation of the order queue is order entry. For instance, consider when a trader submits an order to an exchange. More likely than not, the exchange will confirm the order. The system could then be programmed to adjust the order queue based on the entered order. Then, when the system receives an order fill confirmation or a market update which is associated to that entered order, the system could simply discard the order fill confirmation or market update. If an order fill confirmation or a market update was not received in a certain time frame, then the system could re-adjust the order queue. Similar to order fill information, the more order entry information the system has access to, the more accurate the order queue can become.

Yet another type of available information that might be useful in assisting in the estimation of the order queue is learning from the past and/or present. In other words, the system could use information gathered from the past and/or present such as order sizes, average length of time that an order rests in the particular market, market liquidity, etc. to provide an adaptive solution that better estimates the order queue. Then, the system can learn from any previous occurrences and base its next best guess using such information.

Additionally, the system may track quantity levels at every price level in the market even if the host exchange only provides a particular number of depth in its data feed. Recall that an exchange may provide market updates for a limited number of price levels. However, there are several ways to program the system to handle these scenarios. Some examples of which are given here. Consider price level 100 has 25 available, which is made up of 2 orders. Assume that the market and the "moving window" of updates moves away from price level 100. Then, a short time later, the market and the moving window of updates includes price level 100 and 25 remains available. The system could be programmed that if the price level remains out of view for longer than 30 seconds (or any other programmed time period), the quantity available is estimated to be made up of 1 order. Or, if the price level remains out of view for longer than 30 seconds (or any other programmed time period), the quantity available is estimated to be made up of a number of orders based on the average order size for that particular market (e.g., if the average order size was 10, then there would be 2 orders in this example, rounding down). Or, if the price level does not remain out of view for longer than 30 seconds (or any other programmed time period), the quantity available is estimated to be made up of the previously stored number of orders, which in this example was 2 orders.

V. TRADING INTERFACE

Using the techniques described herein, FIG. 6 illustrates, in general, a way to display market information for a given tradeable object, including the number of orders in an order queue and the position of a trader's order within that queue. Although the present invention is not limited to the particular type of interface shown in FIG. 6, it is used to demonstrate some aspects of the present invention. In addition, more or fewer columns can be included in the interface, but might have been left out for clarity of presentation. The exemplary interface 600 (also identified as a "Trading Window") shown in FIG. 6 includes a working order column 602, an order queue position column 604, a bid quantity column 606, an ask quantity column 608, and a price column 610.

The working order column 602 shows working buy and sell orders that have been placed in the market by a trader. As shown in FIG. 6, the working order column 602 preferably displays the quantity of each working order (represented by a "W") placed by the trader beneath the quantity sold (represented by an "S") or the quantity bought (represented by a "B") by the trader. As an example, in FIG. 6, the interface 600 shows that the trader has placed a working order (or orders) with an ask quantity of 11 at the price level 68.0, and another working order (or orders) with a bid quantity of 20 at the price level 62.0. The interface 600 in FIG. 6 also shows that the trader has not sold or bought any quantities for either of these working orders.

The bid quantity column 606 in FIG. 6 shows the available bid order quantity pending in the market at various price levels. The ask quantity column 608 shows the available ask order quantity pending in the market at various price levels. The price column 610 shows the relevant price levels.

The order queue column 604 in FIG. 6 shows the number of orders in the order queue at a each price level. The example interface indicates that there are a total of "3" orders in the market at the price level 68.0, there are a total of "4" orders in the market at the price level 64.0, there are a total of "2" orders in the market at the price level 63.0, there are a total of "4" orders in the market at the price level 62.0, and there are a total of "3" orders in the market at the price level 59.0. Put another way, the interface in FIG. 6 indicates that the ask quantity of 17 at the price level 68.0 is comprised of "3" orders, the ask quantity of 35 at the price level 64.0 is comprised of "4" orders, the bid quantity of 12 at the price level 63.0 is comprised of "2" orders, the bid quantity of 35 at the price level 62.0 is comprised of "4" orders, and the bid quantity of 15 at the price level 59.0 is comprised of "3" orders.

According to another preferred embodiment, the number of orders in the order queue may be displayed graphically. For instance, in the orders column 604, a cell could be divided up to form two or more "blocks" where each block would represent an order. Then, according to FIG. 6, the cell which has on display 3 orders at the price level 68 would be made up of three "blocks" where each block represents one of the three orders. This is type of representation is graphical in nature rather than the numerical example shown in FIG. 6. Alternatively, a combination of numerical and graphical could be used.

It should be understood that the interface 600 shown in FIG. 6 is merely exemplary, and more or fewer columns, rows, and features may be present in the interface of the present invention. Also, the size of the orders may be displayed in combination with the number of orders (e.g., blocks are wider for large orders and blocks are skinnier for small orders). Moreover, graphical indicators which represent the order queue may also be used.

VI. CONCLUSION

Of course, the invention is not limited to any particular estimation method or algorithm. Depending on how detailed the order and queue information is coming from the exchange, more or less estimation may be necessary (if any estimation is even necessary at all). For instance, if the order and queue information provided by the exchange is detailed enough to assess the number of the orders for a price level, but not the size of each order, then only the sizes of the orders in the queue may need to be estimated. Accordingly, the estimation method or algorithm used in the present invention may depend on the level of detail with the order and queue information provided by the exchange, and the amount and type of estimation needed.

The present method, system, and interface for electronic trading described herein overcomes many disadvantages with, and provides many advantages over, prior art electronic trading methods, systems, and interfaces. For instance, the present invention estimates order queue information from analyzing data feeds. The present invention also enables a trader to view the number and possibly the sizes of working orders in an order queue, thereby allowing the trader to make a better informed decision as to whether or not the trader should enter an order into the queue.

An additional advantage of the present invention lies within its ability to display and represent an order queue for a tradeable object at a given price level in a numerical manner, a graphical manner, or both a numerical and graphical manner. As described above, in a volatile market, orders may be entered, deleted, and/or filled at a very fast pace resulting in more numerous and potentially more frequent updates. These updates, when applied to the activities of a trader who is trading electronically, will appear on that trader's display. This representation may be visible at all times and may be updated each time there is activity at the particular price level.

By providing a graphical display and representation of the order queue, as an alternative, or in addition to, the numerical display and representation, the present invention provides the additional benefit of having easy to see and readily recognizable queue information among an electronic trading interface otherwise filled with numbers.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. Thus, all variations that come within the scope and spirit of the following claims and equivalents thereto are claimed as the invention.

We claim:

1. A computer based method for estimating a number of orders for a tradeable object listed with an exchange, the method comprising:
    receiving by a computing device a market update for the tradeable object where the market update includes a new total quantity associated with a price;
    comparing by the computing device the new total quantity in the market update with a previous total quantity associated with the price;
    estimating by the computing device a number of orders that are at the exchange waiting to be matched at the price in response to the comparison, wherein the number of orders is estimated by:
        increasing the number of orders by one when the new total quantity in the market update has increased in magnitude from the previous total quantity associated with the price indicating an order was added at the exchange at the price;
        decreasing the number of orders by one when the new total quantity in the market update has decreased in magnitude from the previous total quantity associated with the price indicating that a trade for an entire order has occurred;
        decreasing the number of orders by one when the new total quantity in the market update has decreased in magnitude from the previous total quantity associated with the price indicating that an entire order was deleted;
        keeping the number of orders the same when the new total quantity in the market update has decreased in magnitude from the previous total quantity associated with the price indicating that only part of an order was filled; and
        keeping the number of orders the same when the new total quantity in the market update has decreased in magnitude from the previous total quantity associated with the price indicating that an order was changed; and providing the estimated number of orders to a user.

2. The method of claim 1 further comprising the step of estimating a quantity associated with each order of the number of orders at the exchange waiting to be matched at the price.

3. The method of claim 1 further comprising the step of tracking each order of the number of orders in an order queue to represent a queue at the exchange.

4. The method of claim 1 wherein the market update represents either an total market update or a last traded quantity update.

5. The method of claim 1 further comprising updating a graphical user interface based on the estimated number of orders when a change in the number of orders occurs.

6. The method of claim 1 further comprising distributing the estimated number of orders to a client device.

* * * * *

UNITED STATES PATENT AND TRADEMARK OFFICE
CERTIFICATE OF CORRECTION

PATENT NO. : 7,620,576 B1
APPLICATION NO. : 10/348134
DATED : November 17, 2009
INVENTOR(S) : Andrews et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

Signed and Sealed this

Twenty-sixth Day of October, 2010

David J. Kappos
*Director of the United States Patent and Trademark Office*